(12) United States Patent
Bales

(10) Patent No.: US 11,130,212 B2
(45) Date of Patent: Sep. 28, 2021

(54) INFINITELY DIRECTIONAL TRANSLATING CLAMP FOR WELDING A FAN BLADE COVER

(71) Applicant: United Technologies Corporation, Farmington, CT (US)

(72) Inventor: Daniel A. Bales, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 274 days.

(21) Appl. No.: 16/269,728

(22) Filed: Feb. 7, 2019

(65) Prior Publication Data
US 2020/0254588 A1  Aug. 13, 2020

(51) Int. Cl.
*B25B 5/06* (2006.01)
*B25B 5/02* (2006.01)

(52) U.S. Cl.
CPC .............. *B25B 5/068* (2013.01); *B25B 5/02* (2013.01)

(58) Field of Classification Search
CPC .. B25B 5/068; B25B 5/02; B25B 5/14; B25B 5/145; B25B 5/166; B25B 5/006; B25B 5/06; B25B 1/2421; B23Q 3/063; B23Q 3/062; B23Q 3/06; B23K 37/04; B23K 37/0408; B23K 37/0426; B23K 37/0435
See application file for complete search history.

(56) References Cited

U.S. PATENT DOCUMENTS

| | | | | |
|---|---|---|---|---|
| 1,572,046 A | * | 2/1926 | Seiler | B44B 5/0085 30/367 |
| 3,365,349 A | * | 1/1968 | Daniels | B29C 66/1122 156/580.2 |
| 3,934,890 A | * | 1/1976 | Buzzi | B23B 31/207 279/16 |
| 4,547,101 A | * | 10/1985 | Dowdakin, Sr. | B23B 31/08 279/16 |
| 5,069,432 A | | 12/1991 | Reising | |
| 5,798,021 A | * | 8/1998 | Stiles | B23K 37/0435 156/556 |

(Continued)

FOREIGN PATENT DOCUMENTS

DE  10026829 C2  2/2003

OTHER PUBLICATIONS

EP search report for EP20156229.5 dated Dec. 16, 2020.

*Primary Examiner* — Tyrone V Hall, Jr.
*Assistant Examiner* — Makena S Markman
(74) *Attorney, Agent, or Firm* — Getz Balich LLC

(57) ABSTRACT

A directional translating clamping device comprises a housing that includes a distal housing end and proximate housing end separated along a central axis, and a housing recess at the proximate housing end and extending along the central axis end. The device also includes a slide located in the housing recess, and the slide comprises a slide recess at a slide proximate end co-axial with the housing recess, and a detent in a radial sidewall of the slide prevents the slide from translating beyond a predetermined axial distance along the central axis. A spring is located in the housing recess and exerts an axial force on the distal end of the slide. A stub shaft extends from the distal end of the housing. A roller ball assembly includes a threaded sidewall that engages with the slide recess to removably and replaceably secure the roller ball assembly to the slide.

20 Claims, 5 Drawing Sheets

(56) References Cited

U.S. PATENT DOCUMENTS

| | | | |
|---|---|---|---|
| 5,904,284 A * | 5/1999 | Lin | B25C 1/126 |
| | | | 227/11 |
| 6,222,151 B1 | 4/2001 | Ziolkowski et al. | |
| 6,902,093 B1 * | 6/2005 | Chang | B25C 1/02 |
| | | | 173/124 |
| 7,544,912 B2 * | 6/2009 | Yamaoka | B23K 9/0026 |
| | | | 219/104 |
| 8,517,340 B2 | 8/2013 | Pell | |
| 9,878,411 B2 | 1/2018 | Arjakine et al. | |
| 2008/0157453 A1 | 7/2008 | Weller | |
| 2019/0314958 A1 * | 10/2019 | Hwang | B23B 31/107 |
| 2020/0230757 A1 * | 7/2020 | Yonezawa | B23Q 3/06 |

* cited by examiner

400 # INFINITELY DIRECTIONAL TRANSLATING CLAMP FOR WELDING A FAN BLADE COVER

BACKGROUND OF THE INVENTION

1. Technical Field

The present disclosure relates generally to a device for pressing against the face of a first component to be welded to discrete locations of an underlying second component.

2. Background Information

Hollow titanium fan blade construction uses a hot formed 3-D, twisted sheet metal cover (e.g. a first component) that is laser welded to a 3-D, twisted forging (e.g., a second component) that has been semi-finished machined externally with finished machined internal cavities connected by narrow ribs for reduced weight but maintaining structural integrity. Once the sheet metal cover is fitted into the blade body's recess, it is first welded peripherally, then at strategic locations inboard of the peripheral weld. To ensure laser welding is near-perpendicular to the particular surface location of the first component to be welded to the second component, articulation occurs with both the blade's sub-fixture and the independent robot arm to which the laser is attached. Since the surface to be welded is a twisted shape (e.g., approximately 32" length by 13" in width), small variations in height occur as the laser tracks to weld the cover's periphery, and tracks to weld the cover to the internal circular ribs and racetracks. Externally positioned clamps secure the blade body to the base fixture and strategically clamp the cover to the blade body, such that tack welds can be made at pre-determined locations around the periphery that are between the external clamps (e.g., every two inches around the cover periphery). FIG. 1 illustrates a portion of a gas turbine engine fan blade 100 in an intermediate state of manufacture, where a cover (not shown) has not yet been welded to the fan blade 100. Referring to FIG. 1 difficulty occurs when ensuring the cover (not shown) is forced tightly against interior ribs 102 of the twisted forging 100, as well as between peripheral tack weld locations 104. There is a need for improved laser welding of such parts by providing a device that closely proceeds the laser welder so the cover is forced tightly against interior ribs when a tack weld is applied.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a directional translating clamping device that comprises a housing. The housing includes a distal housing end and proximate housing end separated along a central axis by a peripheral sidewall, and a housing recess at the proximate housing end and extending along the central axis toward the distal housing end. A slide is located in the housing recess and comprises a slide recess at a slide proximate end co-axial with the housing recess, and further comprises a detent to prevent the slide from translating along the central axis within the housing recess beyond an axial length of the detent extending along the central axis. A resilient member is located within the housing recess and exerts an axial force on the distal end of the slide. A stub shaft extends from the distal end of the housing. A roller ball assembly engages with the slide recess to removably and replaceably couple the roller ball assembly to the slide.

The stub shaft may comprise a threaded periphery.

The housing may comprise a sidewall bore radially adjacent to the recess.

The sidewall bore may be threaded and receive a threaded pin that extends into the detent.

The housing may include a sidewall bore that receives a pin that extends into the detent.

The stub shaft may comprise a knurled peripheral surface that radially circumscribes the stub shaft.

The housing may be stainless steel.

The roller ball assembly may be coaxial with the slide and the housing.

Aspects of the disclosure are also directed to a directional translating clamping device that comprises a housing. The housing includes a distal housing end and a proximate housing end separated along a central axis, and a housing recess at the proximate housing end and extending along the central axis toward the distal housing end. The device also includes a slide located in the housing recess and the slide comprises a slide recess at a slide proximate end co-axial with the housing recess, and a detent in a radial sidewall of the slide prevents the slide from translating beyond a predetermined axial distance along the central axis. A spring is located in the housing recess and exerts an axial force on the distal end of the slide. A stub shaft extends from the distal end of the housing. A roller ball assembly includes threaded sidewall that engages with the slide recess to removably and replaceably secure the roller ball assembly to the slide.

The stub shaft may comprise a threaded periphery.

The housing may comprise a sidewall bore radially adjacent to the recess.

The sidewall bore may be threaded and receives a threaded pin that extends into the detent.

The sidewall bore may receive a pin that extends into the detent.

The stub shaft comprises a knurled peripheral surface that radially circumscribes the stub shaft.

The housing may be formed of stainless steel.

The roller ball assembly may be coaxial with the slide and the housing.

The slide recess may be formed by an interior surface of the slide, where the interior surface comprises a threaded interior surface section axially extending from the slide proximate end.

The slide recess may be formed by an interior surface of the slide, where the interior surface comprises a threaded interior surface section axially extending from the slide proximate end.

The interior surface may be cylindrical.

The sidewall bore may be threaded and sidewalls of the pin may be threaded to threadedly engage the sidewall bore.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
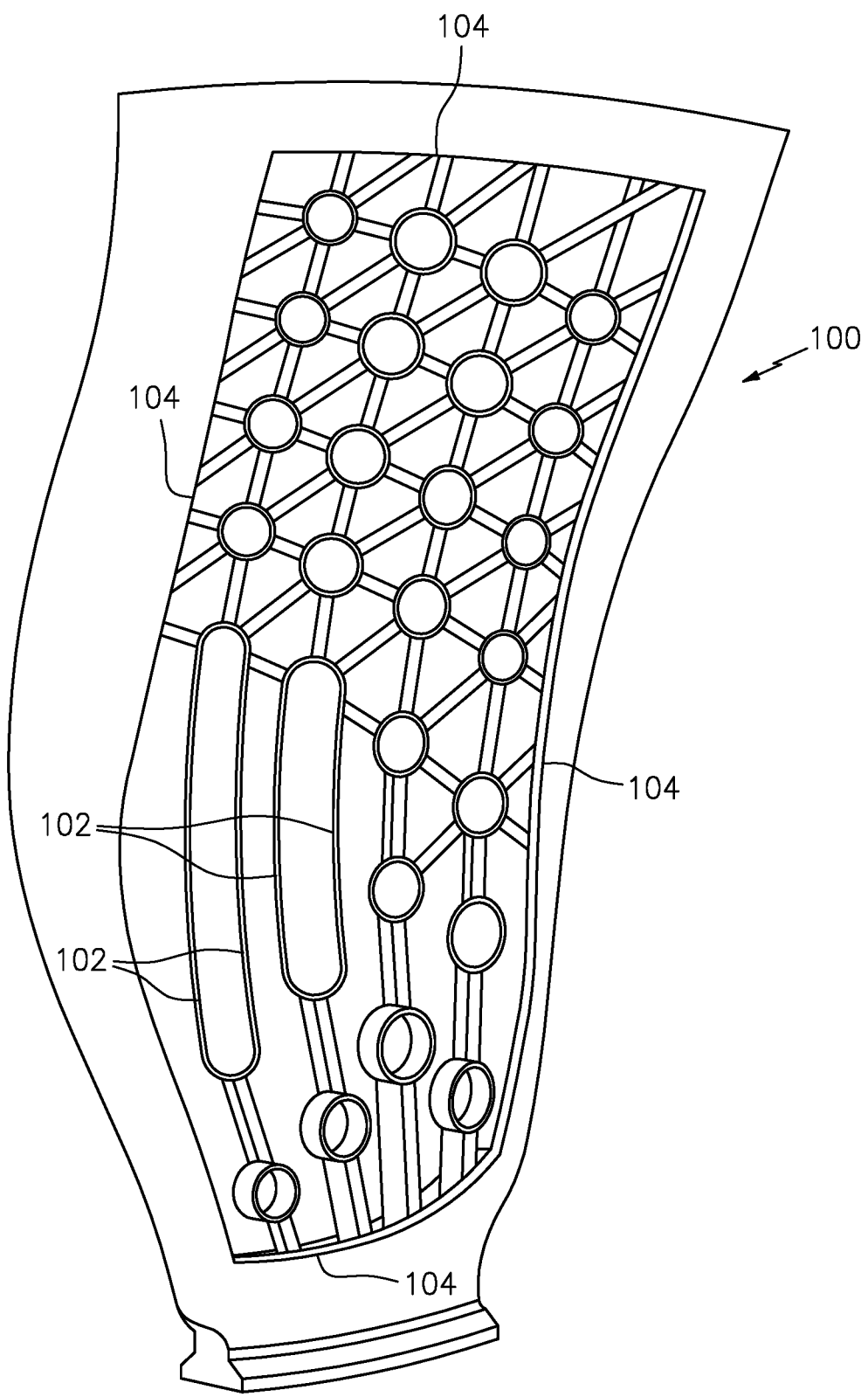
FIG. 1 illustrates a portion of a gas turbine engine fan blade in an intermediate state of manufacture, where a cover (not shown) has not yet been welded to the fan blade.
Figure 2:
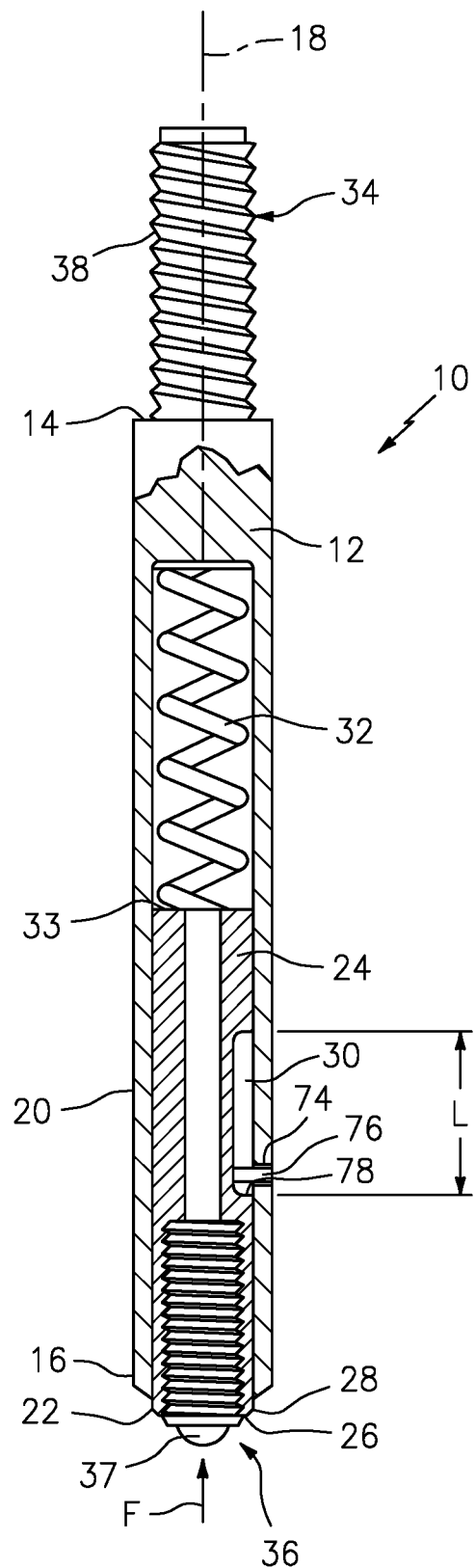
FIG. 2 is a partial cross sectional illustration of a directional translating clamping device.

FIG. 2 is a partial cross sectional illustration of a directional translating clamping device 10. The device 10 may be used to apply force against a first component (e.g., a hot formed 3-D, twisted sheet metal cover) to be welded to a second component (e.g., a 3-D, twisted forging that has been semi-finished machined externally with finished machined internal cavities connected by narrow ribs) at discrete locations of the first component that contacts interior ribs of a second component. The device 10 includes a housing 12 (e.g., stainless steel) comprising a distal housing end 14 and proximate housing end 16 separated along a central axis 18 by a peripheral sidewall 20. The housing may be cylindrical. The housing also comprises a housing recess 22 formed by the peripheral sidewall 20 at the proximate housing end 16 and extending along the central axis 18 toward the distal housing end 14. A slide 24 (e.g., cylindrical) is located in the recess 22 and may comprise a slide recess 26 at a slide proximate end 28 co-axial with the housing recess 22. The slide 24 may also include a detent 30 to prevent the slide from translating along the central axis 18 within the housing recess 22 beyond an axial length L of the detent 30. A resilient member 32 within the housing recess 22 exerts an axial force on distal end 33 of the slide 24. The resilient member 32 may comprise a spiral spring. Depending upon the cover's thickness, the size of the spring shall be sufficient to apply a counter force of about 5 to 25 pounds force, or more narrowly between about 10 to 20 pounds force.

The device 10 also includes a stub shaft 34 axially extending from the distal end 14 of the housing, and a roller ball assembly 36 that engages with the slide recess 26 to removably and replaceably couple the roller ball assembly 36 to the slide 24. Removably and replaceably shall mean that the roller ball assembly can relatively easily be attached and detached to/from the slide, e.g., with no more than a hand tool. In one embodiment the roller ball assembly 36 and the slide recess 26 are both threaded to couple the roller ball assembly 36 to the slide 24. It is contemplated that rather than a threaded connection, other coupling mechanisms such as for example a friction fit, may be used to couple the roller ball assembly 36 to the slide 24. The roller ball assembly 36 includes a ball 37 that is free to rotate in all directions with respect to the central axis 18.

Figure 3:
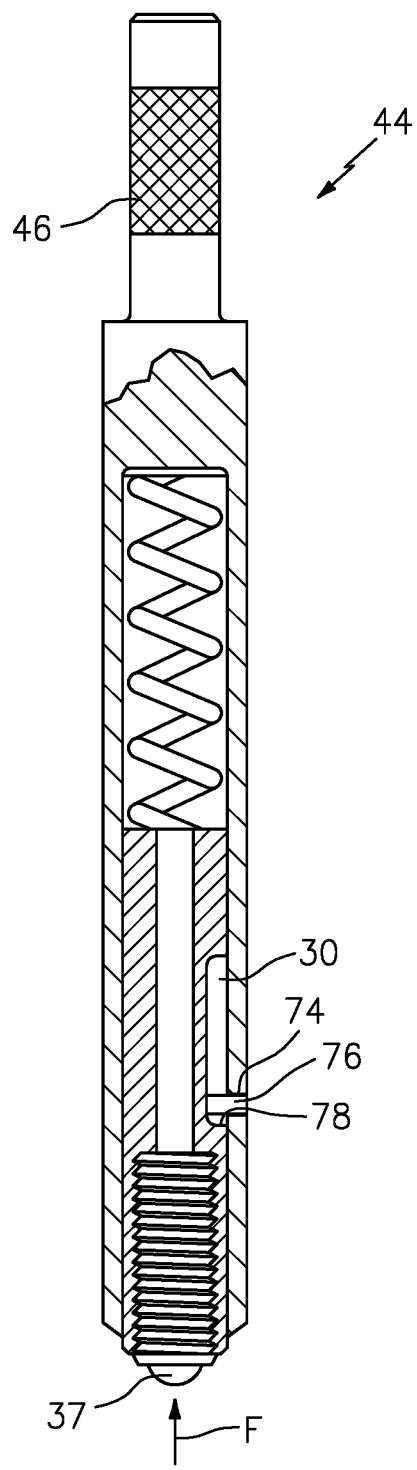
FIG. 3 is a partial cross sectional illustration of an alternative embodiment of a directional translating clamping device.

If the ball 37 is to contact/apply pressure against titanium as part of a welding process, then the material of the ball should be benign with respect to titanium. For example, the ball 37 may be made of silicon nitride. Alternatively, the ball may be made from a precipitation hardenable nickel alloy or precipitation hardenable stainless steel and may include a titanium nitride coating to ensure the ball remains benign with respect to titanium. Referring still to FIG. 2, the stub shaft 34 may comprise a threaded periphery 38 allowing the device 10 to be connected to a threaded end of a robot arm (not shown). FIG. 3 is a partial cross sectional illustration of an alternative embodiment directional translating clamping device 44. The embodiment of FIG. 3 is substantially the same as FIG. 2 with the principal difference being the threaded stub shaft 38 (FIG. 2) has been replaced by a knurled peripheral surface 46 (FIG. 3) that radially circumscribes the stub shaft (e.g., all or a portion thereof). In this alternative embodiment the device 44 may be connected to a robot arm (not shown), for example by a clamp that is secured to the knurled peripheral surface 46.

Figure 4:
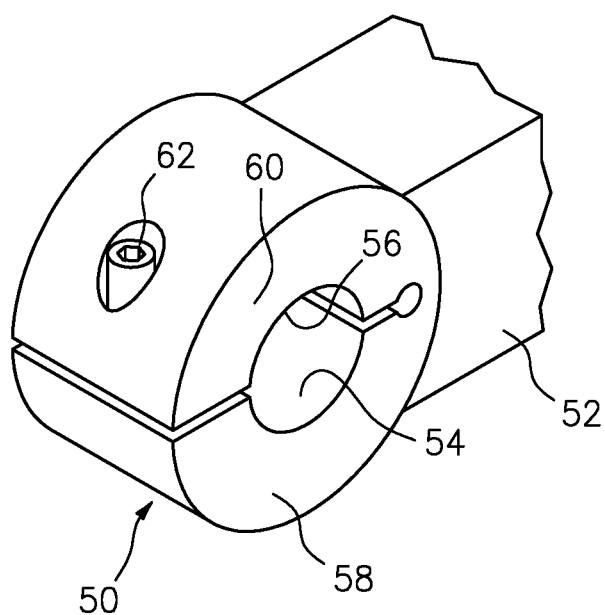
FIG. 4 is a pictorial illustration of a split holder on the end of a robot arm for holding the directional translating clamping device.

FIG. 4 is a pictorial illustration of a split holder 50 on the end of a robot arm 52 for holding the directional translating clamping device 44 illustrated in FIG. 3. Interior surfaces 54, 56 of split holder first element 58 and split holder second element 60, respectively, may also be knurled to engage with the knurled peripheral surface 46 of the directional translating clamping device 44 illustrated in FIG. 3. In addition, the split holder first and second elements 58, 60 may be drawn together via a fastener 62, such as for example a hex head screw.

Figure 5:
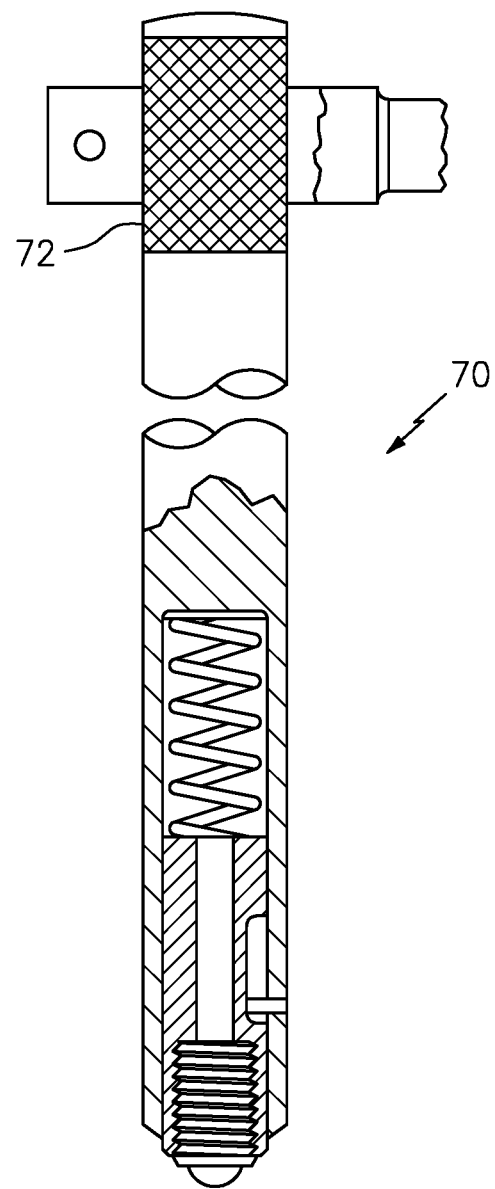
FIG. 5 is a pictorial illustration of a partial cross sectional illustration of an embodiment of a directional translating clamping device with a knurled stub shaft positioned within one piece of robot arm split holder.

FIG. 5 is a pictorial illustration of a partial cross sectional illustration of an embodiment of a directional translating clamping device 70 having a constant outer diameter with a knurled stub shaft 72 positioned within the split holder first element 58.

Referring again to FIGS. 2 and 3, the housing 12 may include a sidewall bore 74 radially adjacent to the detent 30. The sidewall bore 74 may be threaded or friction fit to receive a pin 76 that extends into the detent 30. In the event the sidewall bore 74 is threaded, then in a complimentary manner the pin 76 includes a complimentary threaded surface. FIGS. 2 and 3 illustrate embodiments of the device 10 where force F axially applied to the rotatable ball 37 is greater than the spring force, such that the slide 24 translates within the housing recess 22 and the pin 76 hits/abuts stop 78 of the detent 30. The roller ball assembly 36 may be coaxial with the housing 12 and the slide 24.

In operation, the directional translating clamping device is secured to the arm of a robot laser welder and proceeds the path of a laser welder (e.g., by 0.5 inch to 1.0 inch) as the laser progresses, and provides pressure (e.g., 5 to 25 pounds) to the first component (e.g., a fan blade cover) to ensure proper contact with the second component. A roller ball was selected over a wheel because the roller ball has infinite directionality of movement, whereas a wheel does not. To ensure a consistent high quality weld, the robot's arm tracks above the fan blade cover at a height that is tightly controlled. The rollerball device's axial movement is designed to far exceed its actual axial movement during fan blade cover welding to ensure the proper clamping force is always maintained. The directional translating clamping device maintains intimate contact of the cover with the to-be-welded periphery and internal ribs of a cavity-back hollow fan blade. This ensures consistent, high quality welds throughout a single fan blade, and ensures consistency from blade-to-blade. The device disclosed herein also significantly reduces the number and complexity of fixed clamps that otherwise would be needed, which reduces welding process turn time.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A directional translating clamping device, comprising:
   a housing comprising:
   a distal housing end and proximate housing end separated along a central axis by a peripheral sidewall; and
   a housing recess at the proximate housing end and extending along the central axis toward the distal housing end;
   a slide located in the housing recess and comprising a slide recess at a slide proximate end co-axial with the housing recess, and further comprising a slide distal end opposite the slide proximate end and a detent in a radial sidewall of the slide, wherein the detent has an axial length and is configured to limit translation of the slide along the central axis within the housing to the axial length of the detent;
   a resilient member, located within the housing recess between the slide distal end and the distal housing end, that contacts and exerts an axial force on the slide distal end;
   a stub shaft extending from the distal end of the housing; and
   a roller ball assembly that engages with the slide recess to removably and replaceably couple the roller ball assembly to the slide, the roller ball assembly including a ball that is free to rotate in all directions with respect to the central axis.

2. The directional translating clamping device of claim 1, wherein the stub shaft comprises a threaded periphery.

3. The directional translating clamping device of claim 1, wherein the housing comprises a sidewall bore which extends through the housing radially adjacent to the detent.

4. The directional translating clamping device of claim 1, wherein the ball is made of silicon nitride.

5. The directional translating clamping device of claim 1, wherein the ball is made of a first material and a titanium nitride coating applied to the first material.

6. The directional translating clamping device of claim 3, wherein the sidewall bore is threaded and receives a threaded pin that extends into the detent.

7. The directional clamping device of claim 3, wherein the sidewall bore receives a pin that extends into the detent.

8. The directional translating clamping device of claim 1, wherein the stub shaft comprises a knurled peripheral surface that radially circumscribes the stub shaft.

9. The directional translating clamping device of claim 1, wherein the housing is stainless steel.

10. The directional translating clamping device of claim 1, wherein the roller ball assembly is coaxial with the slide and the housing.

11. A directional translating clamping device, comprising:
    a housing comprising:
    a distal housing end and proximate housing end separated along a central axis; and
    a housing recess at the proximate housing end and extending along the central axis toward the distal housing end;
    a slide located in the housing recess and comprising a slide recess at a slide proximate end co-axial with the housing recess, and further comprising a slide distal end opposite the slide proximate end and a detent in a radial sidewall of the slide, wherein the detent is configured to prevent the slide from translating beyond a predetermined axial distance along the central axis;
    a spring that is located in the housing recess and that contacts and exerts an axial force on the distal end of the slide; and
    a roller ball assembly that includes a threaded sidewall that engages with the slide recess to removably and replaceably secure the roller ball assembly to the slide, the roller ball assembly including a ball that is free to rotate in all directions with respect to the central axis.

12. The directional translating clamping device of claim 11, further comprising a stub shaft extending from the distal end of the housing, wherein the stub shaft comprises a threaded periphery.

13. The directional translating clamping device of claim 11, wherein the housing comprises a sidewall bore radially adjacent to the detent.

14. The directional translating clamping device of claim 13, wherein the sidewall bore receives a pin that extends into the detent.

15. The directional translating clamping device of claim 11, further comprising a stub shaft extending from the distal end of the housing, wherein the stub shaft comprises a knurled peripheral surface that radially circumscribes the stub shaft.

16. The directional translating clamping device of claim 11, wherein the housing is stainless steel.

17. The directional translating clamping device of claim 11, wherein the roller ball assembly is coaxial with the slide and the housing.

18. The directional translating clamping device of claim 1, wherein the slide recess is formed by an interior surface of the slide, wherein the interior surface comprises a threaded interior surface section axially extending from the slide proximate end.

19. The directional translating clamping device of claim 17, wherein the slide recess is formed by an interior surface of the slide, wherein the interior surface comprises a threaded interior surface section axially extending from the slide proximate end.

20. The directional translating clamping device of claim 19, wherein the interior surface is cylindrical.

* * * * *